United States Patent
Pandey et al.

(10) Patent No.: US 11,520,664 B2
(45) Date of Patent: Dec. 6, 2022

(54) METADATA BASED DATA REPLICATION

(71) Applicant: International Business Machines Corporation, Armonk, NY (US)

(72) Inventors: Ashish Pandey, Pune (IN); Venkateswara Rao Puvvada, Inkollu (IN); Abhishek Jain, Baraut (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/920,918

(22) Filed: Jul. 6, 2020

(65) Prior Publication Data

US 2022/0004459 A1 Jan. 6, 2022

(51) Int. Cl.
| | | |
|---|---|---|
| *G06F 12/00* | (2006.01) | |
| *G06F 11/14* | (2006.01) | |
| *G06F 11/34* | (2006.01) | |
| *G06F 16/182* | (2019.01) | |
| *G06F 16/16* | (2019.01) | |
| *G06F 9/54* | (2006.01) | |
| *G06F 11/30* | (2006.01) | |

(52) U.S. Cl.
CPC ......... *G06F 11/1435* (2013.01); *G06F 9/546* (2013.01); *G06F 11/1451* (2013.01); *G06F 11/1464* (2013.01); *G06F 11/3034* (2013.01); *G06F 11/3466* (2013.01); *G06F 16/162* (2019.01); *G06F 16/1844* (2019.01); *G06F 2201/80* (2013.01)

(58) Field of Classification Search
None
See application file for complete search history.

(56) References Cited

U.S. PATENT DOCUMENTS

| | | |
|---|---|---|
| 7,320,088 B1 | 1/2008 | Gawali |
| 2014/0317366 A1 | 10/2014 | Sakata |
| 2017/0116207 A1 | 4/2017 | Lee et al. |

(Continued)

FOREIGN PATENT DOCUMENTS

| | | |
|---|---|---|
| WO | 2016105337 A1 | 6/2016 |
| WO | 2019025960 A1 | 2/2019 |

OTHER PUBLICATIONS

"Introduction to Active File Management (AFM)," IBM Knowledge Center, Printed: Apr. 9, 2020, 2 pgs. https://www.ibm.com/support/knowledgecenter/STXKQY_5.0.0/com.ibm.spectrum.scale.v5r00.doc/bl1ins_introafm.htm.

(Continued)

*Primary Examiner* — Daniel D Tsui
(74) *Attorney, Agent, or Firm* — Kimberly Zillig

(57) ABSTRACT

A plurality of computing nodes is monitored for updates to one or more files located on the plurality. Based on the monitoring, a first file operation is detected that is related to a first file located on a first node. The first file is related to a first copy that is located on a second node. Based on the first file operation, it is determined that the first file operation is a copy operation of the first file to a second file located on the first node. A copy command related to the first file is transferred, in response to the copy operation, to the second node. In response to the copy operation, a second copy file is created on the second computing node of the plurality. The second copy file is related to the second file located on the first computing node of the plurality.

16 Claims, 6 Drawing Sheets

(56) References Cited

U.S. PATENT DOCUMENTS

| | | |
|---|---|---|
| 2017/0124112 A1 | 5/2017 | Vaghani et al. |
| 2017/0147601 A1 | 5/2017 | Kaushik et al. |
| 2017/0155713 A1* | 6/2017 | Powell ................ G06F 11/2094 |
| 2018/0143766 A1* | 5/2018 | Brown .................... G06F 3/067 |

OTHER PUBLICATIONS

"Cache and Home," IBM Knowledge Center, Printed: Apr. 9, 2020, 2 pgs. https://www.ibm.com/support/knowledgecenter/STXKQY_5.0.0/com.ibm.spectrum.scale.v5r00.doc/bl1ins_cacheandhomeAFM.htm.

"AFM-based Asynchronous Disaster Recovery (AFM DR)," IBM Knowledge Center, Printed: Apr. 9, 2020, 2 pgs. https://www.ibm.com/support/knowledgecenter/en/STXKQY_5.0.0/com.ibm.spectrum.scale.v5r00.doc/bl1ins_introductionafmdr.htm.

"List of AFM metrics," IBM Knowledge Center, Printed: Apr. 9, 2020, 6 pgs. https://www.ibm.com/support/knowledgecenter/en/STXKQY_5.0.0/com.ibm.spectrum.scale.v5r00.doc/bl1adv_listofmetrics_afm.htm.

Mell et al., "The NIST Definition of Cloud Computing", Recommendations of the National Institute of Standards and Technology, Special Publication 800-145, Sep. 2011, 7 pages.

PCT/CN2021/097737 International Search Report and Written Opinion dated Sep. 1, 2021.

\* cited by examiner

METADATA BASED DATA REPLICATION

BACKGROUND

The present disclosure relates to file replication, and more specifically, to leveraging metadata to perform data copy operations.

Data replication may operate to replicate a file operation performed on a first computer to another computer. Data replication may permit computers located at different locations maintain a coherence logical file system for user access. Data replication may be performed with processing cycles and network bandwidth.

SUMMARY

According to embodiments, disclosed are a method, system, and computer program product.

A data replication system monitors a plurality of computing nodes for updates to one or more files located on the plurality. Based on the monitoring, a first file operation related to a first file is detected. The first file is located on a first computing node of the plurality. The first file is related to a first copy file. The first copy file is located on a second computing node of the plurality. Based on the first file operation, it is determined that the first file operation is a copy operation of the first file to a second file. The second file is located on the first computing node of the plurality. A copy command related to the first file is transferred, in response to the copy operation, to the second computing node of the plurality. In response to the copy operation, a second copy file is created on the second computing node of the plurality. The second copy file is related to the second file located on the first computing node of the plurality.

According to embodiments, the transferring of the copy command further includes, updating, responsive to the copy operation, the metadata related to the first file with the copy command; and, transferring in response to the metadata, the updated metadata of the first file to the second computing node of the plurality.

According to embodiments, the first file including the data of the first file is not transferred to the second computing node of the plurality.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
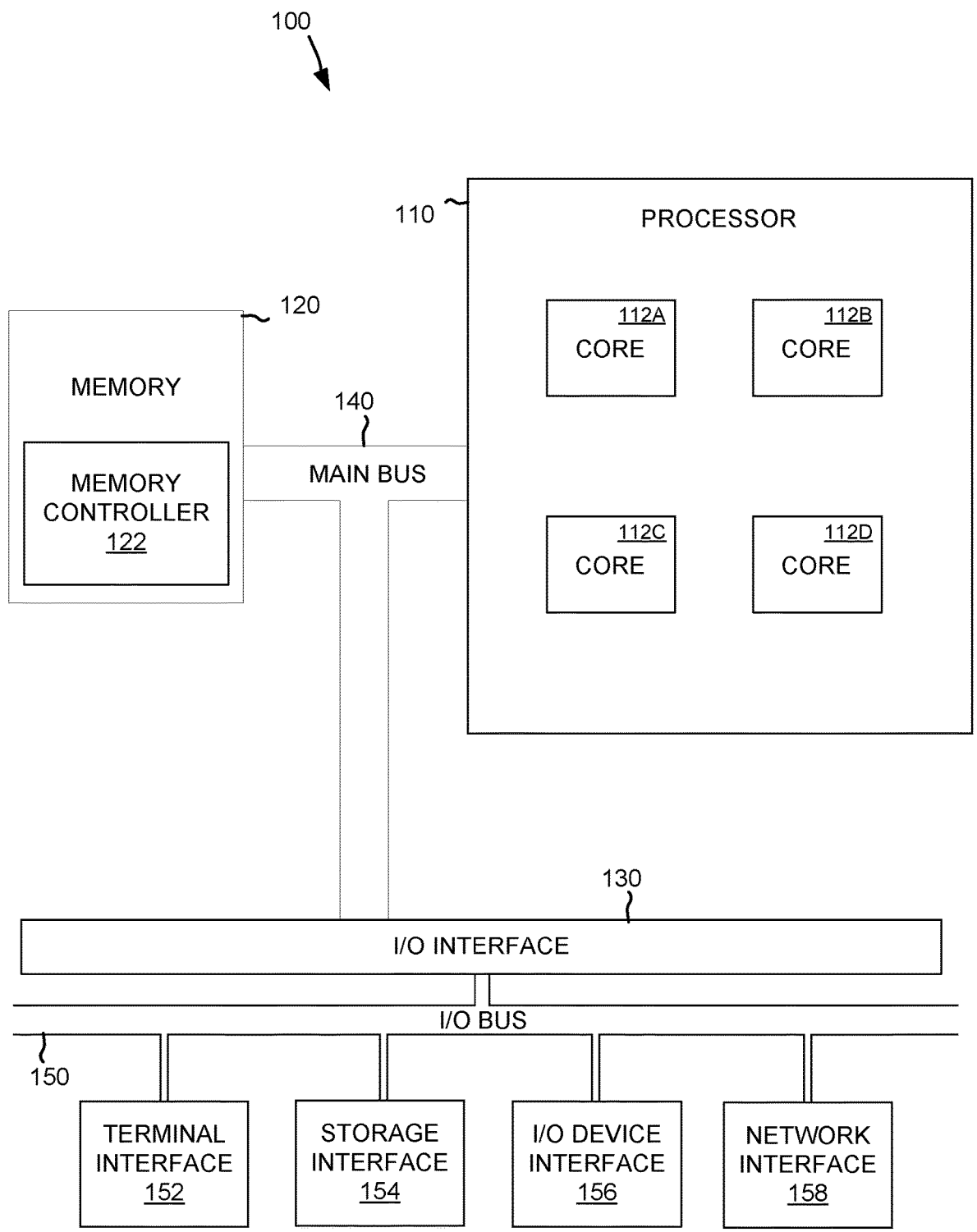
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data replication; more particular aspects relate to leveraging metadata to perform data copy operations. While the present disclosure is not necessarily limited to such applications, various aspects of the disclosure may be appreciated through a discussion of various examples using this context.

Data replication systems can be used in an ever more diverse number of information systems and computer systems. A data replication system may be a part of a distributed file system. A distributed file system that supports local disks on cluster nodes and storage area networks (SANs). Logical isolation and physical isolation are supported so that file sets can be separate inside of a file system (logical isolation) or can be part of separate storage pools (physical isolation). Examples of a data replication system may include Active File Management™ (AFM) of an IBM Global Parallel File System™ (GPFS) distributed file system.

A data replication system may be a scalable, high-performance, file system caching layer integrated into distributed file systems. Data replication systems may allow creation of associations from a local cluster of a system to a remote cluster of the system. Data replication may allow creation of associations from a local cluster of system to another storage device (e.g., an auxiliary storage device, a cold storage device, a backup device). Data replication systems may also allow an implementation of a singular namespace view across multiple clusters or across multiple geographic locations. Data replication systems may use a home-and-cache model. For example, a single home provides the primary storage of data, and exported data is cached in a local file system.

Data replication systems may further enable disaster recovery through a fileset level replication disaster recovery capability to augment overall computer system recovery operations. The disaster recovery operations may implement strict one to one active-passive models. The data replication system may implement a two-site policy including a primary site and a secondary site. The primary site may be a read-writeable fileset where the applications are currently running, and they have read-write access to the data. The secondary site may be recommended to be read-only. All data from a primary site may be asynchronously replicated to the secondary site. All file user data, metadata, hard links, renames, and clones from the primary may be replicated to the secondary. All file system and fileset related attributes such as user, group, or fileset quotas, replication factors and dependent fileset form the primary may not be replicated to the secondary. A consistent point-in-time view of the data in the primary fileset can be propagated in-line to the secondary fileset with the use of fileset based snapshots.

A data replication system may have performance or other computing drawbacks. For instance, a data replication system may perform the same file-system operations on a local file system and a remote file system. When a local file system performs an update or a save to a local file, a corresponding remote copy of the file may also be updated. To maintain system integrity, the replication operations may happen often, or in near real time. In some instances, the replication may be performed in asynchronous near-real time. Examples of file operations, may be creation of files, updating of files, moving of files, copying of files, deleting of files, and other relevant file operations.

As more and more complex operations are performed on distributed file systems, a data replication system may run into performance bottlenecks. For instance, many users may be performing updates to data stored on portions of a distributed file system, and all of the updates need to be sent across a network between the various computing nodes. In another instance, large complex datasets may tie up a significant portion of network bandwidth for transmission between computing nodes. The updates may be delayed or queued such that they are performed later, but that may lead to data integrity issues, as delayed files become out of sync with the workloads being performed at each of the nodes. In many of these cases, the memory and processing power of each node may be tied up with handling operations to offset the network performance. For instance, a distributed file system may choose to have each node having an update to a file compress the file before it is transferred, and then have the receiving node decompress the file on the other side. The compression and decompression may consume memory and processor resources.

A metadata aware data replication system (MADRS) may provide for improved data replication. A MADRS may operate by detecting file operations on a local computing node and determining that the file operation is a copy operation. The MADRS may operate by determining that the copy operation is performed on an existing first file (e.g., a local source file) that is already located on the local computing node, and directed to a new second file (e.g., a local destination file). The MADRS may further operate by determining that the existing first file on the local computing node has an existing replicated copy (alternatively, a first copy file) already located on a secondary computing node. The MADRS may transfer a copy command directed at a respective replicated copy of the first file (alternatively, a first copy file) to a second computing node of the data replication system. The MADRS may update a metadata of a first file to indicate that the first file is copied to the second file (e.g., to signal the copy command before transfer). The MADRS may include a path, destination, uniform resource location (URL), or other filesystem location in the metadata. The data replication system may detect the command (or updated metadata) and may perform the copy remotely, at a second computing node, based solely on the existing replicated copy. For example, by creating a new replicated second file that corresponds to the new second file, based on the existing replicated first copy file and based on the information stored in the command (or metadata).

The MADRS may transfer only the metadata and not the file to any of the remote nodes of the distributed file system. For example, a first local file may be copied to a second local file on a first computing node. The MADRS may detect the copy and may generate metadata related to the first local file. The generated metadata related to the first local file may include the name and the destination (e.g., the path) of the second local file. The generated metadata may cause a portion of the data replication system to transfer the updated metadata to a second computing node (or any other computing node) of the distributed file system. The second computing node may create, based on the updated metadata, a second copy file, on the second computing node. The creation may be performed without any access to the original non-copy version of the first local file but based only on the path information from the metadata and based on the first copy file.

In some embodiments, the MADRS may transfer only a copy command and not the file to any of the remote nodes of the distributed file system, meaning that no file data is transferred to the other nodes. For example, a first local file may be copied into a second local file on a first computing node. The MADRS may detect that the first local file was copied and may set metadata associated with first local file to include the copy operation and to include the path to the second local file. Responsively, the system may detect the metadata and may generate a copy command for transfer to another node of the distributed file system (e.g., a second computing node). The second computing node may, responsive to the received copy command, create a second copy file of a first copy file on the second computing node. The creation may be performed without any access to the original non-copy version but based only on the path information from the command.

The copy operation may be a privileged operation, such as from a privileged application, kernel, super user, operating system, hypervisor, and the like. For example, a copy operation from a first file represented by a first local inode, is copied to a second file represented by a second local inode. The copy operation may be performed using a byte-by-byte copy to another file or performed by an in-kernel copy operation using a system call between two file descriptors, or the like. The copy operation may be from a non-privileged operation, such as from an application or program of a user that is executing on a computing node. For example, the non-privileged operation may further leverage the byte-by-byte copy to prevent the additional memory and processing costs of transferring data from the kernel to user space and then back into the kernel. The non-privileged operation may be a "CP" command issued by a user having limited privileges. The non-privileged operation may be a "move" command issues by an application that does not have elevated privileges.

The non-transfer of files may save memory, processing, and network utilization. As metadata and/or copy commands may be of a relatively small size, the transfer costs on network performance may be low. Further, as the metadata and/or commands do not need to be compressed, the processing and memory usage of the MADRS may be greatly reduced. Practically speaking, many bytes of bandwidth and many input/output operations may be avoided by only sending the metadata and/or a command.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
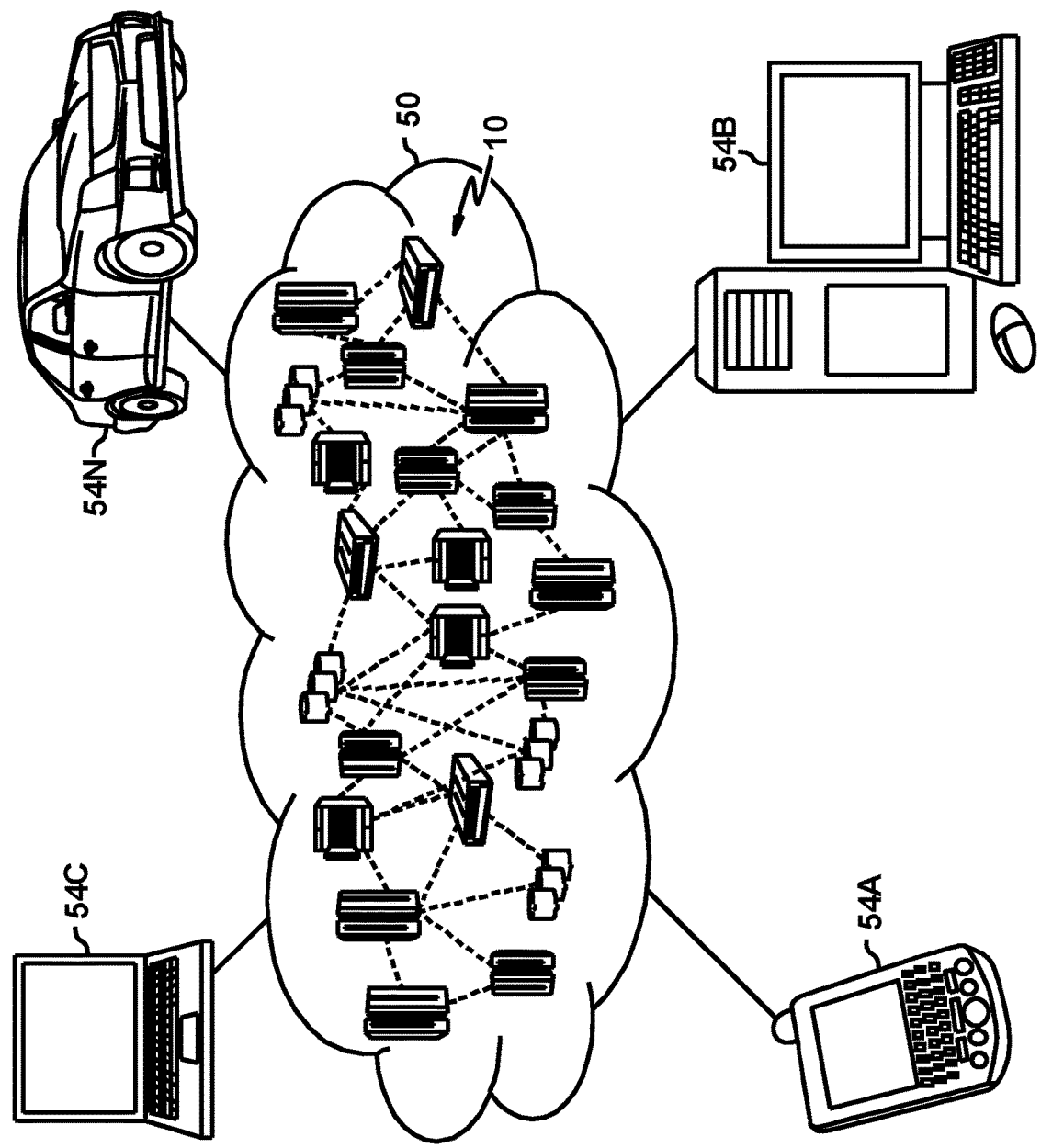
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
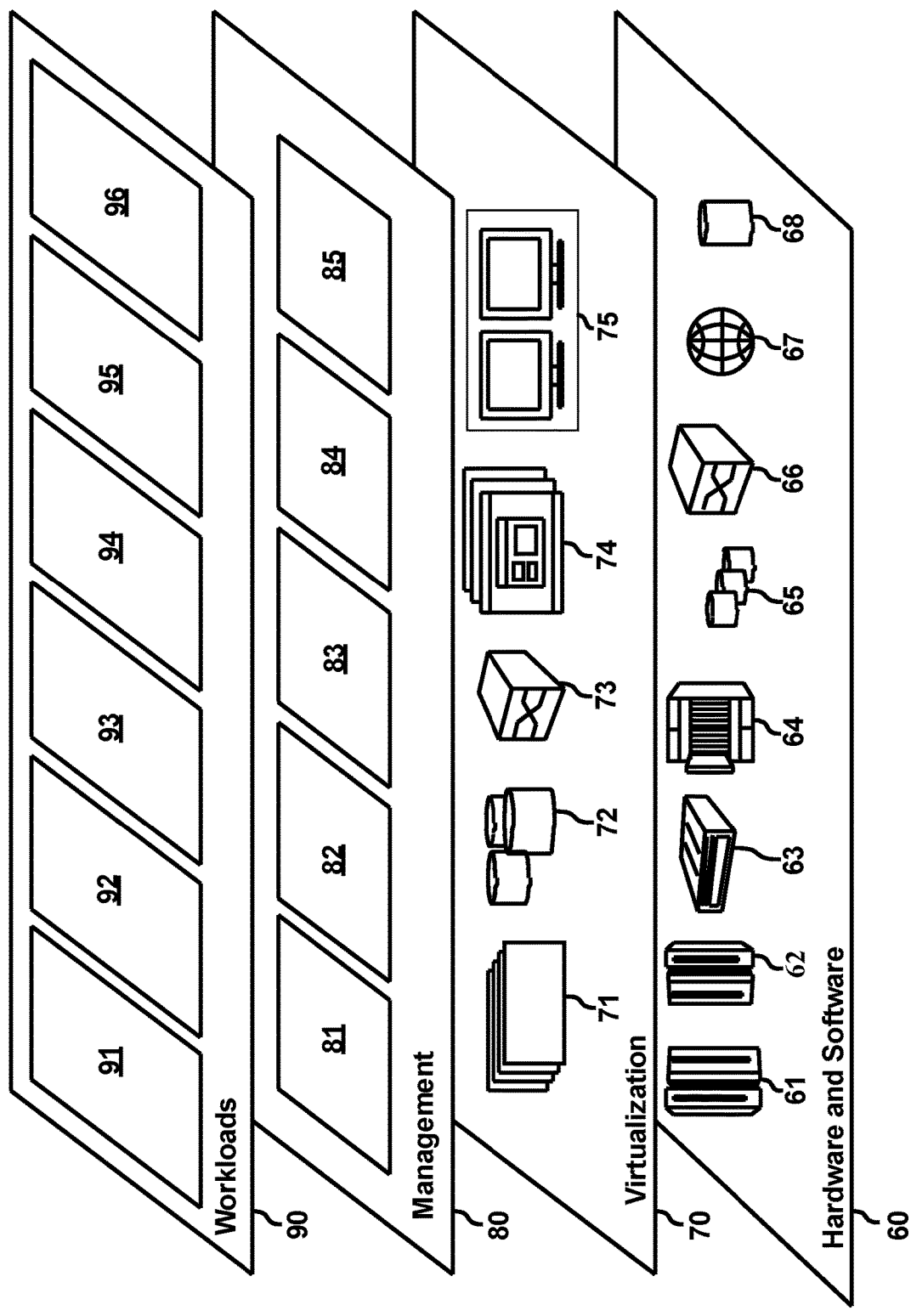
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and one of a plurality of data replication 96.

Figure 4:
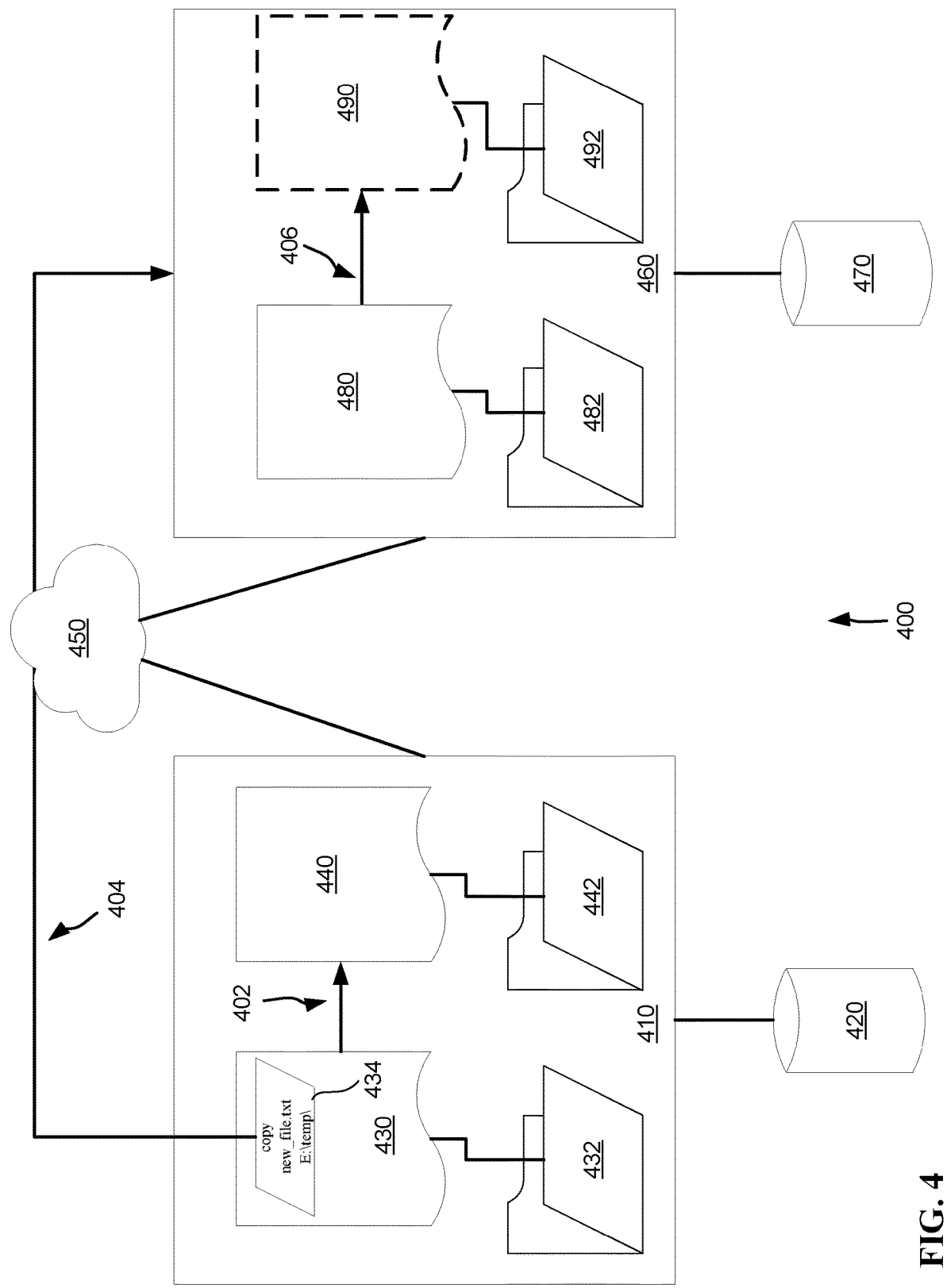
FIG. 4 depicts an example system for performing data replication, consistent with some embodiments of the disclosure.

FIG. 4 depicts an example system 400 for performing data replication, consistent with some embodiments of the disclosure. System 400 may be a MADRS and may operate as a collection of computing nodes as a distributed file system, to create caching of files at remote computing nodes while reducing network, processing, and memory resources of one or more nodes of the system. System 400 may operate as part of a cloud computing environment, such as the cloud computing environment 50. System 400 may include a plurality of computing nodes at least including a first computing node 410 and a second computing node 460; and, a network 450 communicatively coupling the plurality. For example, purposes only a first computing node 410 and a second computing node 460 are depicted. It should be appreciated, that other configurations of system 400 are contemplated that include many (e.g., three, eight, or more) computing nodes, and two nodes are described for ease of depiction.

First computing node 410 may be a computer configured to host and provide user access to data. First computing node 410 may be a computer system, such as computer system 100. First computing node 410 may be configured to store and retrieve files from a first data store 420. First data store 420 may be a database, file system, storage device, or the like, for data that is local to the first computing node 410. For example, data store 420 may be a file system running on a cluster of disk drives communicatively coupled directed to the first computing node 410.

Likewise, second computing node 460 may be a computer configured to host and provide user access to data. Second computing node 460 may be a computer system, such as computer system 100. Second computing node 460 may be configured to store and retrieve files from a second data store 470. Second data store 470 may be a database, file system, storage device, or the like, for data that is local to the second computing node 460. For example, data store 470 may be a file system cache running on a drive communicatively coupled directed to the second computing node 460.

System 400 may operate to replicate data between the first computing node 410 and the rest of the nodes of the plurality. System 400 may operate as a MADRS to facilitate replication without performing certain data transfers, such as copying of files from one computing node to another of the plurality.

In more detail, first computing node 410 may have a first local file (first file) 430. The first local file 430 may be located at a first path 432 in the first datastore 420. The first local file 430 may be copied to a second local file 440 based on a first file operation 402. The first file operation 402 may be performed by a non-privileged or privileged operation, such as a user application move, a kernel level copy, or the like. The first file operation 402 may create the second local file 440 at a second path 442 in the first datastore 420. For example, a file named "example.txt" may be at location "C:\directory1\" may be copied by first file operation 402 into a second file name "new_file.txt" at location "E:\temp\" within datastore 420.

The system 400 may detect the first file operation 402, determine that the first file operation is a copy operation, and, based on the determination, one or more metadata 434 of the first local file 430 may be updated. The metadata 434 may be data associated with or otherwise related to the first local file 430. For example, metadata 434 may be in the form of an "xattr" value. In another example, the metadata 434 may be in the form of one or more extended attributes. The metadata 434 may be in a predetermined format, and the updating of the metadata may be creating one or more values in the predetermined format. For example, the metadata may be in the form of key-value pairs, and the updating may be in the form of creating three key value pairs as follows: a first key equal to "command" with a value equal to "copy", a second key equal to "name" with a value equal to "new_file.txt", a third key equal to "path" with a value equal to "E:\temp\".

At 404 the metadata 434 may be transferred to the second computing node 460 of the plurality. In some embodiments at 404, and based on the metadata 434, a command may be generated, and the command may be transferred to the second computing node 460 of the plurality. The second computing node 460 may already have a copy of the first local file (first copy file) 480. The first copy file 480 may be located at a first copy path 482. The first copy path 482 may correspond to the first path 432. After the transfer at 404 to the other computing nodes of the plurality, including the second computing node 460, the updated metadata may be deleted, or otherwise removed from the first local file 430.

At 406, a copy of the second local file (second copy file) 490 may be created. The Second copy file 490 may be created without any transfer of the first local file 430. For example, the second copy file 490 may be created solely from the data contained in the first copy file 480 and from the command received at 404. The second copy file 490 may be created in the second computing node 460 at a second path 492.

Figure 5:
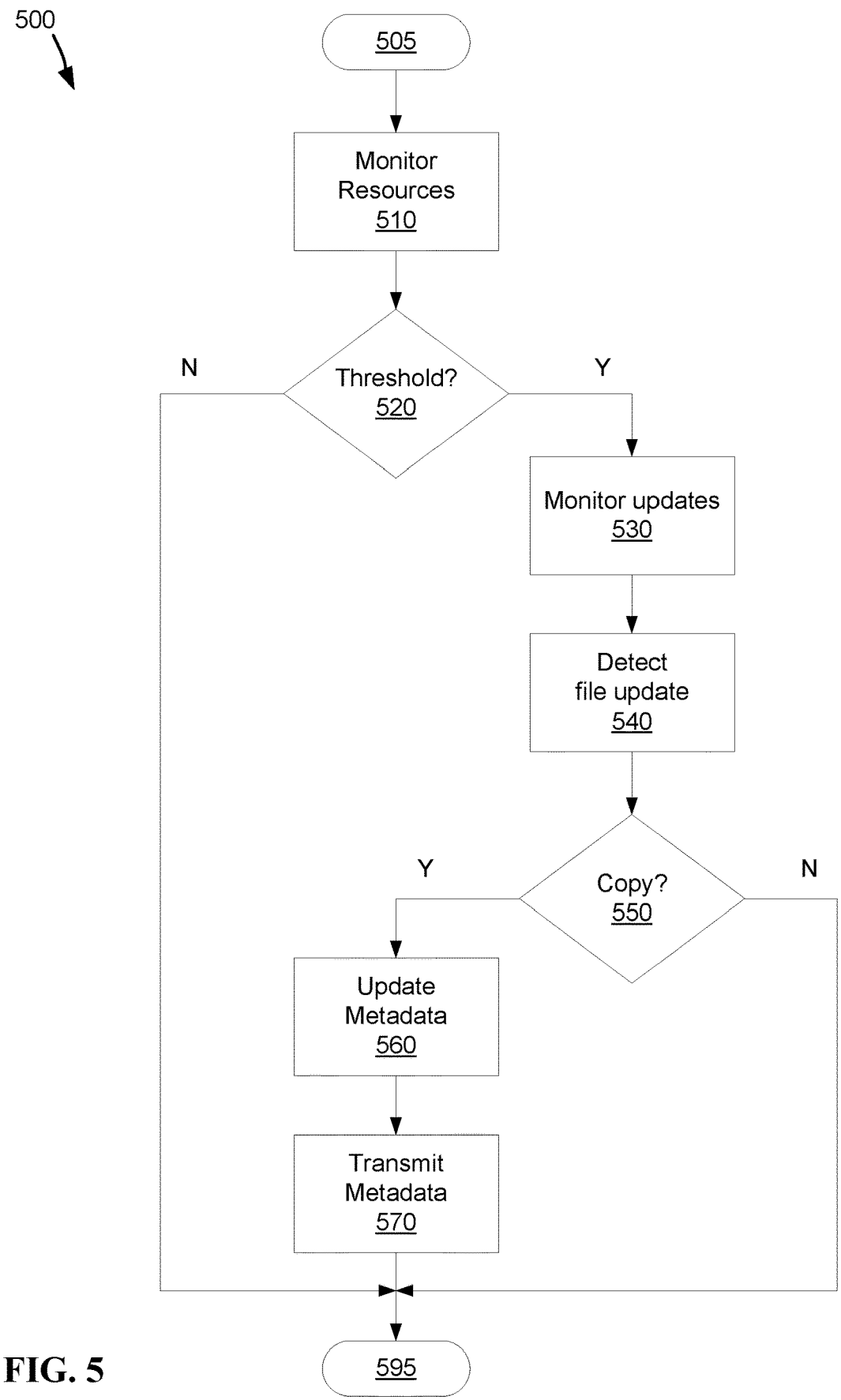
FIG. 5 depicts an example method for performing data replication, consistent with some embodiments of the disclosure.

FIG. 5 depicts an example method 500 for performing data replication, consistent with some embodiments of the disclosure. Method 500 may be performed by a data replication system, such as data replication system 400 depicted in FIG. 4. Method 500 may be performed by a single node of a plurality of computing nodes of a distributed storage system. For example, method 500 may be performed by first computing node 410 of data replication system 400.

From start 505, one or more computing resources of the data replication system are monitored at 510. The data replication system resources may be the memory footprint, processor utilization, network activity, or other relevant metric of data replication system 400. The data replication system resource monitoring may be based on one or more predetermined performance thresholds. The monitoring may include a determination that a predetermined performance threshold is adhered to. For example, the predetermined performance threshold may be a network of data replication system 400, and the monitoring may be determining whether the bandwidth of the network 450 exceeds a predetermined value. In another example, a file input/output queue of one or more nodes of the plurality, including the first node 410 and the second node 460 may be monitored to determined that a queue size is not exceeded. In yet another example, a processor utilization or other load of the plurality may be monitored, and the predetermined performance threshold is a processor utilization below 65% maximum processor load. In yet still another example, file sizes of files are monitored, and a predetermined performance threshold is a file size larger than 130 megabytes. If a predetermined performance threshold is not reached, at 520:N, method 500 ends at 595.

If a predetermined performance threshold is reach, at 520:Y, one or more files on a given node may be monitored for updates at 530. The monitoring for updates may be performed by a first computing node of the plurality, such as first computing node 410 or second computing node 460 of system 400. The monitoring for updates may be performed across the data replication system. During monitoring for updates to one or more files, an update may be detected at 540 that is directed to a specific file (e.g., a first file). For example, the update may be a creation, deletion, addendum, insertion, deletion, or other access of a file. If an update of a file is not a copy at 550:N, method 500 ends at 595.

If an update of a file is a copy, at 550:Y, metadata related to the file may be updated at 560. The updated metadata may be updated based on the copy operation. For example, details of the copy operation such as the path or location of the copied file may be updated into the metadata. At 570, the command of the updated metadata may be transmitted to another computing node of the plurality of computing nodes. For example, given system 400, if a file is copied on second computing node 460, then metadata regarding the copy may be transmitted to first computing node 410. After the metadata is transmitted at 570, method 500 ends at 595.

Figure 6:
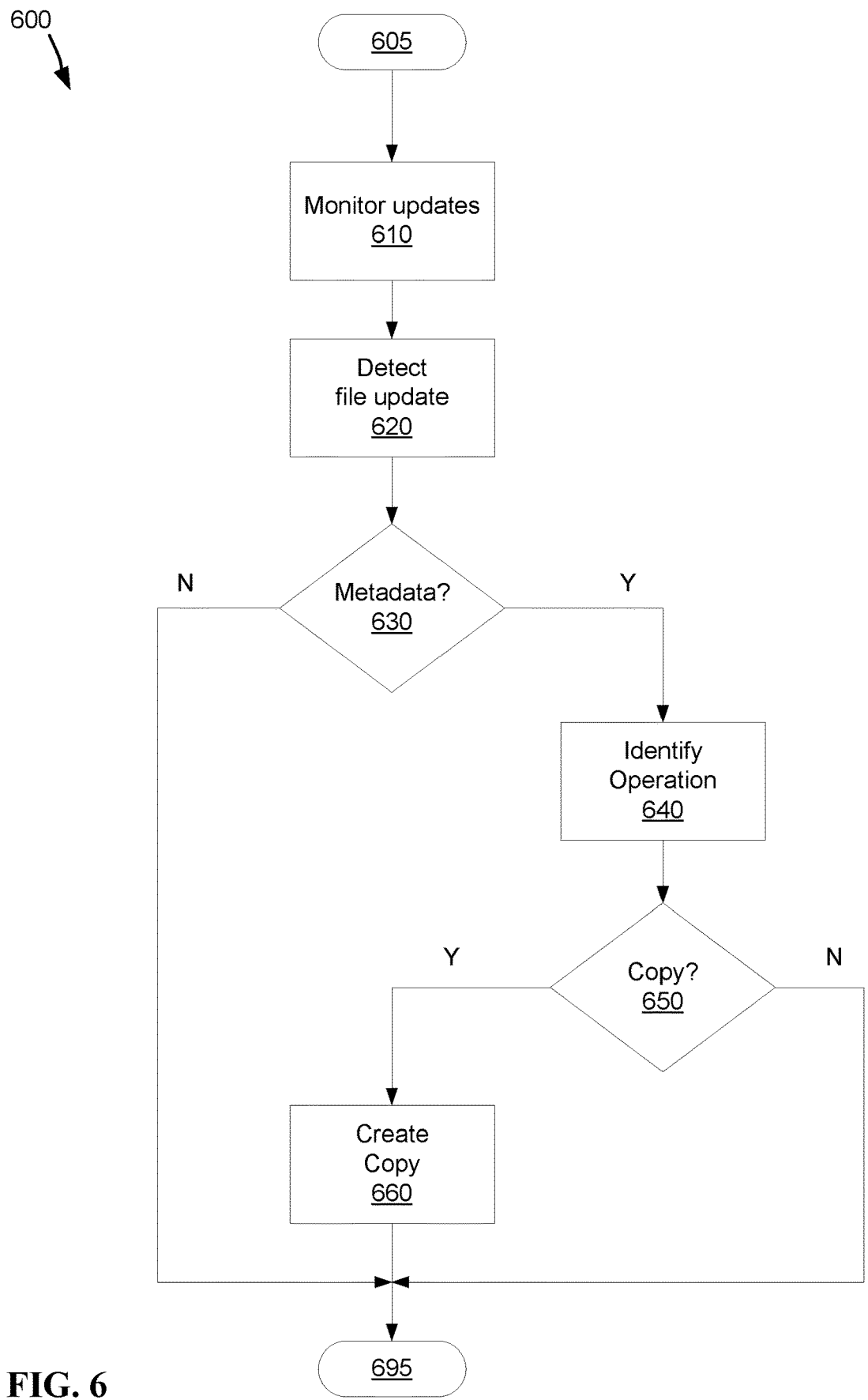
FIG. 6 depicts an example method for performing data replication, consistent with some embodiments of the disclosure.

FIG. 6 depicts an example method 600 for performing data replication, consistent with some embodiments of the disclosure. Method 600 may be performed by a data replication system, such as data replication system 400. Method 600 may be performed by a single node of a plurality of computing node of a distributed storage system. For example, method 600 may be performed by first computing node 410 of data replication system 400.

From start 605, updates to one or more files on a computing node may be monitored at 610. The monitoring may be performed by monitoring an input queue of a computing node, such as an input queue of first computing node 410. The monitoring may be for updates received from additional computing nodes. For example, first computing node 410 may be monitored for updates from another computing node of the plurality of computing nodes. At 620, an update to a first file on the computing node may be detected. The first file update may be an update to the content of the file, such as new data from another computing node of the data replication system. The first file update may be an update to the metadata of a file, such as an update to one or more values or extended attributes of the first file. The update to the first file may be in the form of a command, such as a delete or copy command directed towards the first file. The update may be in a predetermined format, such as a multi-part command with associate values. For example, a command may be in the form of a first value of "copy", a second value of "C:\directory1\file1.txt" and a third value of "C:\directory2\file1-copy.txt" contained as values in metadata related to a local file.txt of the receiving computing node. If the update is not a command or if the update is not a metadata update, at 630:N, method 600 may end at 695.

If the update is a command or a metadata update, at 630:Y, method 600 may continue by identifying the type of operation that is in the command or metadata. If the command is not a copy operation at 650:N, then method 600 may end at 695. If the command is a copy operation at 650:Y, then a copy operation may be performed on the computing node that detected the file update. The copy operation may be performed without receiving any actual file data from the input queue or from another of the computing nodes. For example, the copy may be created based on the copy command that was a part of the detected file update. The created copy may be located at a specified path on the local computing node. The specified path may be determined from the copy command in the detected file update. After the copy is created locally on the receiving computing node, method 600 ends at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   determining, by a data replication system and based on a first file operation, the first file operation is a copy operation of a first file located on a first computing node of a plurality of computing nodes to a second file, the second file located on the first computing node of the plurality, wherein the first file is related to a first copy file, the first copy file located on a second computing node of the plurality;
   updating, by the data replication system and in response to the copy operation, a metadata related to the first file with a copy command; and
   transferring, by the data replication system and in response to the metadata, the updated metadata of the first file to the second computing node of the plurality.

2. The method of claim 1, wherein the first file is not transferred to the second computing node of the plurality.

3. The method of claim 1, wherein the updating the metadata includes updating one or more extended attributes related to the first file.

4. The method of claim 1, wherein the updating the metadata includes creating one or more values in a predetermined format.

5. The method of claim 4, wherein the method further comprises:
   deleting, by the data replication system and after the creating the second copy file, the one or more values in the metadata of the first file.

6. The method of claim 1, wherein the second file is located at a specific path within the first computing node, and wherein the second copy file is created in a specific copy path located on the second computing node, the specific copy path corresponding to the specific path.

7. The method of claim 6, wherein the metadata includes the specific path.

8. The method of claim 1, wherein the copy operation is performed by an application executing on the first computing node.

9. The method of claim 8, wherein the updating of the metadata related to the first file is performed by a privileged application executing on the first computing node.

10. The method of claim 8, wherein the copy operation is selected from the group consisting of a copy and a move.

11. The method of claim 1, further comprising:
    transferring, by the data replication system and in response to the copy operation, the copy command related to the first file to the second computing node of the plurality; and
    creating, by the data replication system and in response to the copy command, a second copy file on the second computing node of the plurality,
    wherein the second copy file is related to the second file located on the first computing node of the plurality,
    wherein the creation is based solely on information from within the copy command.

12. A data replication system, the data replication system comprising:
    a memory, the memory containing one or more instructions; and
    a processor, the processor communicatively coupled to the memory, the processor, in response to reading the one or more instructions, configured to:
       monitor for updates to one or more files located on a first node of a plurality of computing nodes;
       detect, based on the monitoring, a first file operation related to a first file,
       wherein the first file is related to a first copy file, the first copy file located on a second computing node of the plurality;
       determine, in response to the first file operation, the first file operation is a copy operation of the first file to a second file, the second file located on the first computing node of the plurality;
       update, in response to the copy operation, a metadata related to the first file; and
       transmit, in response to the metadata, the updated metadata of the first file to the second computing node of the plurality.

13. The data replication system of claim 12, wherein the update of the metadata includes creating one or more values in a predetermined format.

14. The data replication system of claim 13, wherein the processor is further configured to:
    delete, after the transmitting of the updated metadata to the second computing node, the one or more values in the metadata of the first file.

15. A computer program product, the computer program product comprising:
    one or more computer readable storage media; and
    program instructions collectively stored on the one or more computer readable storage media, the program instructions configured to:
       determine, based on a first file on a first computing node of a plurality of computing nodes, an update to the first file is to a metadata related to the first file, wherein the first file is related to a first copy file, the first copy file located on a second computing node of the plurality;
       identify, based on the metadata, a copy operation in the metadata related to the first file; and
       create, in response to the metadata and based on the copy operation, a second copy file on the second computing node of the plurality,
       wherein the second copy file is related to the second file located on the first computing node of the plurality.

16. The computer program product of claim 15, wherein the input queue of the second node of the plurality does not receive the first file.

* * * * *